Dec. 2, 1958  H. A. KULJIAN  2,862,415
PARTICLE COUNTING OPTICAL APPARATUS
Filed Aug. 12, 1954

INVENTOR.
HARRY A. KULJIAN
BY
ATT'Y

United States Patent Office 2,862,415
Patented Dec. 2, 1958

2,862,415

PARTICLE COUNTING OPTICAL APPARATUS

Harry A. Kuljian, Merion, Pa.

Application August 12, 1954, Serial No. 449,467

1 Claim. (Cl. 88—14)

This invention relates to a micro-particle counting apparatus.

In medicine, it is frequently necessary to make blood counts to determine the average number of red blood cells etc. Also, in the industrial field it is frequently necessary to determine the distribution of various particles in various vehicles.

It has heretofore been proposed to place a specimen of the blood, or other material, to be examined, on a slide and to examine it visually under a microscope having the necessary magnifying power. This is difficult work and, because it is difficult to make sure that the entire area of the specimen has been scanned, without repetition, an accurate count may not always be obtained.

Furthermore, the human eye, after a little fatigue, may wander a bit so that some particles may be counted twice and other particles may not be counted at all.

It is therefore the object of the present invention to produce an improved particle counting apparatus which is accurate, rapid, and wholly automatic.

The full nature of my invention, will be understood from the following specification and the accompanying drawing in which.

Figures 1, 2:
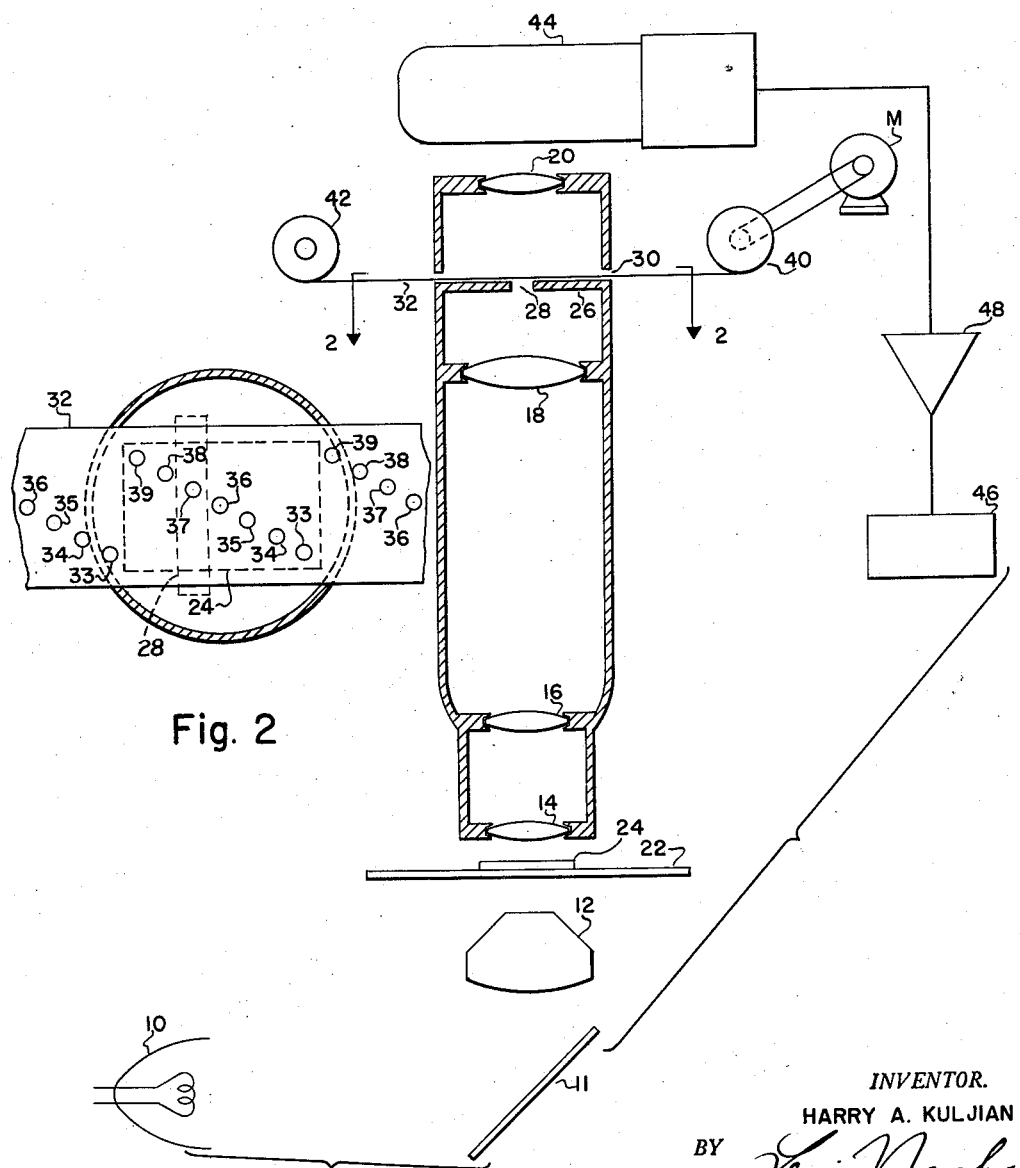
Fig. 1 is a fragmentary and diagrammatic view, partly in section, showing a particle counting apparatus embodying my invention.
Fig. 2 is an enlarged sectional view looking in the direction of line 2—2 on Fig. 1.

In the drawings there is shown a conventional microscope 8 having a source of light 10, a mirror 11, a condenser 12, objective lenses 14 and 16, eye piece lenses 18 and 20, and a stage 22 for supporting a specimen 24 to be examined. The microscope is preferably monocular as there is no need for two eye pieces as in the case of microscopes used for visual examination.

To adapt a conventional microscope to carry out my invention, I place a buffer plate 26 below eye piece 20 and provide this plate with an opening 28 of a predetermined size. Above the plate 28 I provide a slot 30 through which is adapted to pass a flexible scanning tape 32 having a series of staggered apertures 33 to 39 formed in it in the manner shown in Fig. 2. The tape may be moved in either direction above hole 28, manually, or by a suitable mechanical arrangement such as motor M and rolls 40 and 42. Above eye piece 20, I mount a photo electric cell 44 which is connected to a suitable electronic counter 46, through an amplifier 48. Since the photo electric cell, the amplifier and the counter are conventional and form no part of the present invention, they are only shown schematically. The tape 32 may be of any desired material and, instead of a flexible tape, a piece of opaque rigid material having holes 33 to 39 therein can be used. Such piece can be moved, manually, or by means of screws in the manner in which the stage of a conventional microscope is moved. As the tape is moved over opening 28, apertures 33 to 39 will scan parallel segments of the specimen. Because, the size of each of apertures 33 to 39 is approximately equal to the size to which the particle to be counted will be magnified by the microscope, only one particle can be seen through any of the apertures. For example, if red blood corpuscles are to be counted and if they are to be magnified to a 50 micron diameter each of apertures 33 to 39 will have a 50 micron diameter so that only one corpuscle can be seen through any one of these apertures. Likewise, and as shown in Fig. 2, the width of opening 28 is approximately equal to the diameter of each of apertures 33 to 39 and the length of the opening 28 is equal to the width of tape 32. Also, as shown in Fig. 2, apertures 33 to 39 are arranged diagonally across a rectangular area of the tape which is congruent with the area of the specimen 24 to be scanned. By this arrangement, as tape 32 moves across the top of opening 28 only one of the apertures 33 to 39 will register with opening 28 at any one time. By the time the whole series of apertures 33 to 39 passes over opening 28, the entire area of the specimen 24 to be examined will have been scanned. If any one of apertures 33 to 39 happens to pass over a corpuscle, or other particle to be counted, while said aperture is in registration with opening 28, such particle will activate the photo-electric cell and its presence will be recorded, and vice versa. Because the amount of material to be examined is known, and because only one corpuscle, or particle, can be seen at one time, the incidence, or distribution of particles can be ascertained fairly accurately. For a more precise count, the tape is passed repeatedly back and forth over the specimen and the counts thus derived are averaged.

Instead of moving the tape, or other element having apertures 33 to 38, the specimen can be moved and the tape can be held stationary. The light may be passed through, or it may be reflected from, the surface of the specimen to be examined according to the nature of the particles to be counted or according to the medium which carries the particles.

While in the drawing I show only six relatively large apertures in the tape, it is to be understood that this is merely for the purpose of illustration and that the size and the number of apertures can be varied. As stated, the size of each aperture in the tape 32 should be about equal to the diameter of the particular particle to be counted and the arrangement of such apertures and the area of the rectangle diagonally traversed by apertures 33 to 39 should be such that the area of the predetermined specimen is scanned.

What I claim is:

A particle counting apparatus including a stage for supporting a specimen, said specimen having a predetermined area supporting a predetermined amount of material to be scanned, a plate having a slit therein and disposed above said specimen, a tape having groups of apertures therein and movable across said slit, the diameter of each aperture being equal to the width of said slit and said apertures of each group being arranged diagonally of said tape, and means for magnifying the diameter of the particle to the diameter of said aperture whereby, when a group of apertures passes over said slit, only one of said apertures will register with said slit at one time.

References Cited in the file of this patent

UNITED STATES PATENTS

| | | |
|---|---|---|
| 2,184,159 | Stockbarger et al. | Dec. 19, 1939 |
| 2,480,312 | Wolf | Aug. 30, 1949 |
| 2,494,441 | Hillier | Jan. 10, 1950 |
| 2,661,902 | Wolff et al. | Dec. 8, 1953 |